United States Patent [19]

Harada

[11] Patent Number: 5,473,634
[45] Date of Patent: Dec. 5, 1995

[54] SIGNAL CONVERTER AND COMMUNICATION SYSTEM

[75] Inventor: Hiroyuki Harada, Itami, Japan

[73] Assignee: Mitsubishi Denki Kabushiki Kaisha, Tokyo, Japan

[21] Appl. No.: 245,655

[22] Filed: May 18, 1994

[30] Foreign Application Priority Data

May 19, 1993 [JP] Japan ................. 5-116846

[51] Int. Cl.$^6$ ............................................. H04B 14/04
[52] U.S. Cl. .................. 375/242; 375/244; 375/346; 371/37.1
[58] Field of Search ..................... 375/25, 99, 94, 375/101, 53, 27, 242, 244, 254, 340, 346; 371.4/37.1, 40.1, 43

[56] References Cited

U.S. PATENT DOCUMENTS

| | | | |
|---|---|---|---|
| 4,568,915 | 2/1985 | Gutleber | 375/96 X |
| 4,833,693 | 5/1989 | Eyuboglu | 375/99 X |
| 5,056,112 | 10/1991 | Wei | 375/53 |

*Primary Examiner*—Stephen Chin
*Assistant Examiner*—Bryan E. Webster
*Attorney, Agent, or Firm*—Oblon, Spivak, McClelland, Maier & Neustadt

[57] ABSTRACT

A storage medium (15) has capacity capable of storing data for one frame which is formed by $2^M$ by $2^N$ bits. A counter circuit (12) repetitively counts bit numbers of input signals in a range of 1 to $2^M$ by $2^N$, while another counter circuit (13) counts frame numbers. A signal selection circuit (14) specifies addresses the storage medium (15) in an order obtained by successively carrying out N-digit leftward rotation every renewal of the frame number with respect to the count value of the counter circuit (12) expressed in a binary number. A control signal R/W specifies reading and writing in the storage medium (15) every addressing. Thus, data signals DIN belonging to one frame written in the storage medium (15) are read when a next frame is written. The order of the read data signals is leftwardly rotated by N bits with respect to that in writing. Thus, the storage capacity of the storage medium (15) can be halved as compared with the prior art.

19 Claims, 11 Drawing Sheets

| 0 | 4 | 8 | 12 | 16 | 20 | 24 | 28 |
|---|---|---|---|---|---|---|---|
| 1 | 5 | 9 | 13 | 17 | 21 | 25 | 29 |
| 2 | 6 | 10 | 14 | 18 | 22 | 26 | 30 |
| 3 | 7 | 11 | 15 | 19 | 23 | 27 | 31 |

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |

| 0 | 8 | 16 | 24 | 1 | 9 | 17 | 25 |
|---|---|---|---|---|---|---|---|
| 2 | 10 | 18 | 26 | 3 | 11 | 19 | 27 |
| 4 | 12 | 20 | 28 | 5 | 13 | 21 | 29 |
| 6 | 14 | 22 | 30 | 7 | 15 | 23 | 31 |

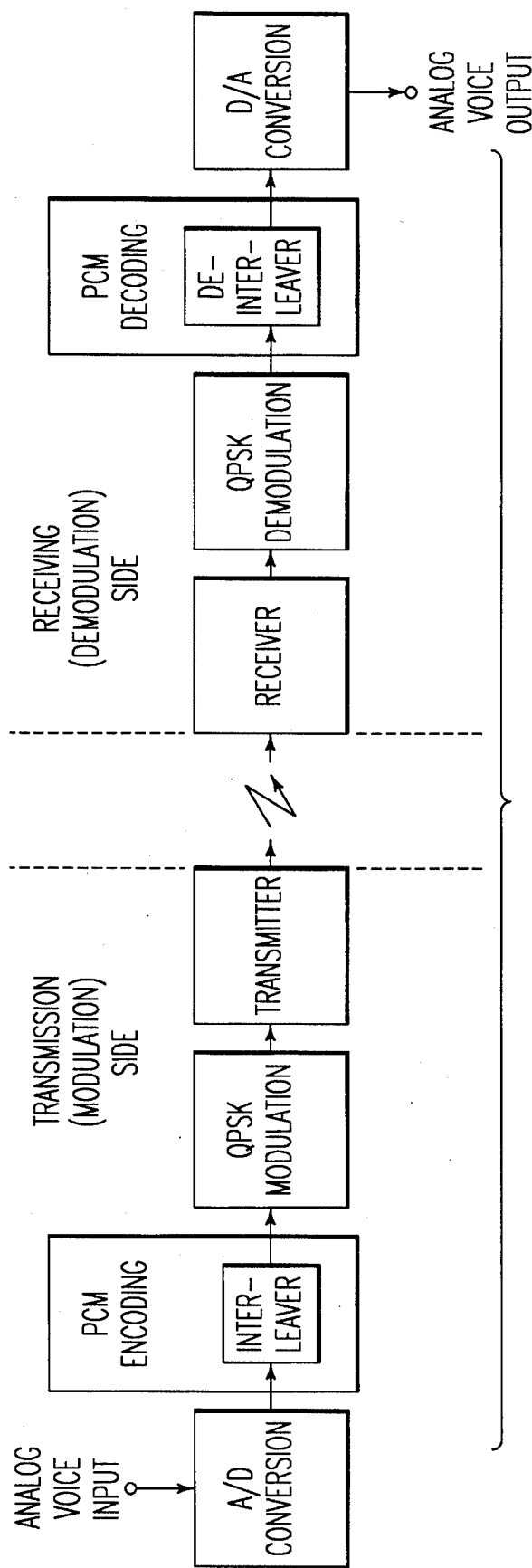

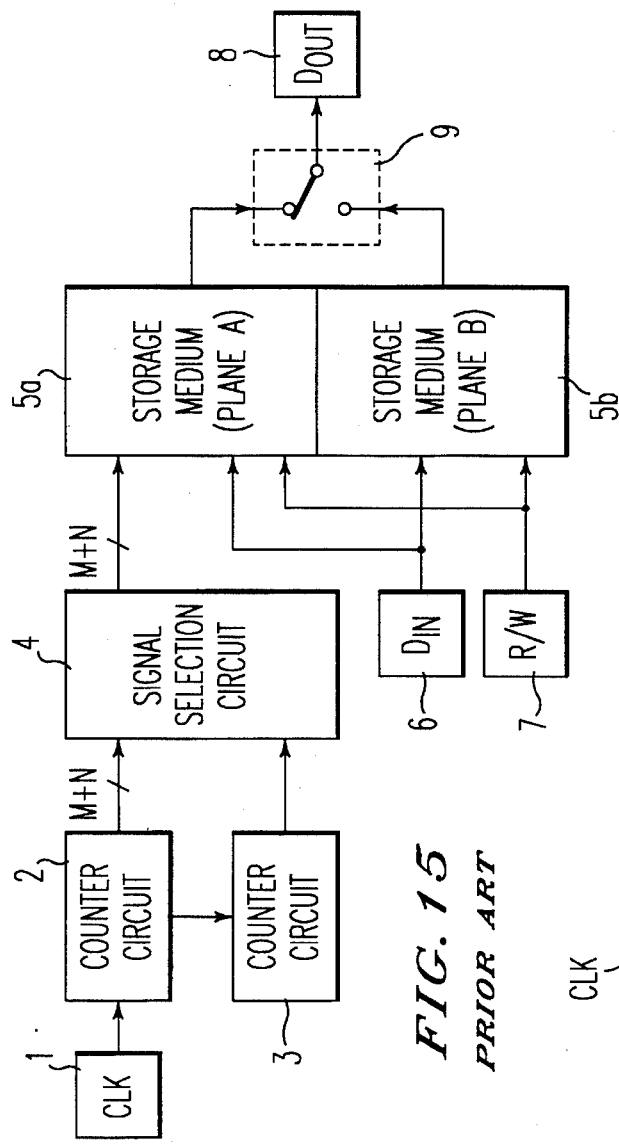
FIG. 15
PRIOR ART
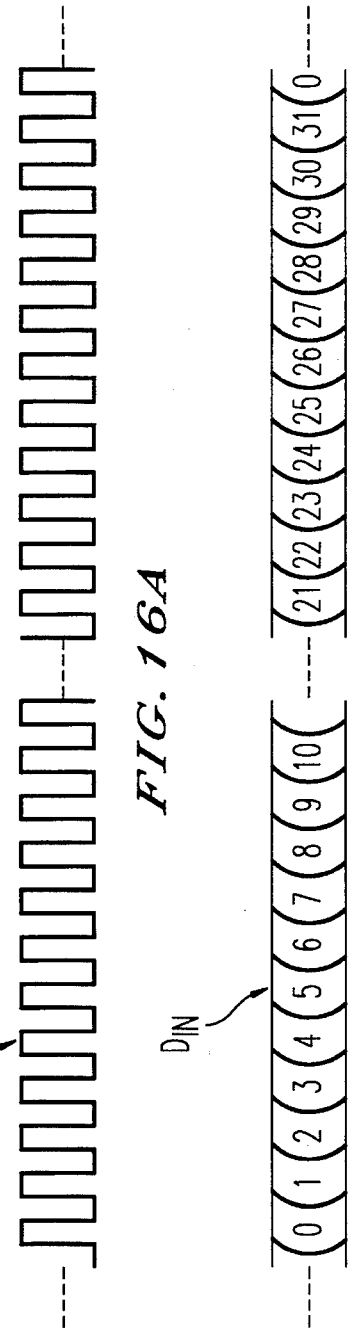
FIG. 16A
FIG. 16B

| 0 | 4 | 8 | 12 | 16 | 20 | 24 | 28 |
|---|---|---|----|----|----|----|----|
| 1 | 5 | 9 | 13 | 17 | 21 | 25 | 29 |
| 2 | 6 | 10 | 14 | 18 | 22 | 26 | 30 |
| 3 | 7 | 11 | 15 | 19 | 23 | 27 | 31 |

*FIG. 18* PRIOR ART

| 0 | 4 | 8 | 12 | 16 | 20 | 24 | 28 |
|---|---|---|----|----|----|----|----|
| 1 | 5 | 9 | 13 | 17 | 21 | 25 | 29 |
| 2 | 6 | 10 | 14 | 18 | 22 | 26 | 30 |
| 3 | 7 | 11 | 15 | 19 | 23 | 27 | 31 |

*FIG. 19* PRIOR ART

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |

*FIG. 20* PRIOR ART

SIGNAL CONVERTER AND COMMUNICATION SYSTEM

BACKGROUND OF THE INVENTION

1. Field of the Invention

The present invention relates to a communication system for carrying out digital data communication through encoding and decoding in an interleaving system, and a signal converter employed for the communication system.

2. Background of the Invention

In a digital data communication system, data signals which are transmitted from a transmission side to a receiving side may cause code errors. An interleaving system is known as a prevailing method of enabling normal communication upon occurrence of such code errors. This interleaving system is adapted to change the list of data signals which are lined up in a time-series manner in accordance with a certain constant rule, for transmitting the data signals. According to this system, therefore, it is considerably possible to decode the data signals on the receiving side also when burst errors are caused, in particular. When the data signals are interleaved on the transmission side, it is necessary to de-interleave the same on the receiving side in accordance with the rule employed in transmission, for restoring the original data list. For example, the satellite broadcasting system in Japan is one of the communication systems employing the interleaving system.

FIG. 15 is a block diagram showing a conventional de-interleaver. An interleaver is similar in structure to the de-interleaver shown in FIG. 15, and hence only the de-interleaver is now described, to omit redundant description. In this de-interleaver, de-interleaving is completed in the minimum unit (hereinafter referred to as "frame") of $2^M$ by $2^N$ with respect to positive integers M and N. In other words, one frame is formed by $2^M$ by $2^N$ bits.

A space for de-interleaving is formed by storage media 5a and 5b, which are addressable in a range of 1 to $2^M$ by $2^N$ so that 1-bit length data signals can be written in and read from the respective addresses. A counter circuit 2 repetitively counts the number of clock pulses which are inputted from a clock input terminal 1 synchronously with bitwise digital data signals within a range of 1 to $2^M$ by $2^N$. Another counter circuit 3 repetitively counts the number of repetition of the counter circuit 2 counting 1 to $2^M$ by $2^N$, in a range of 1 and 2. A signal selection circuit 4 which is connected with outputs of the two counter circuits 2 and 3 outputs address signals for addressing the storage media 5a and 5b on the basis of count values of the counter circuits 2 and 3.

A de-interleaving operation in this de-interleaver is now described. While one frame is formed by 64 by 32 bits (2048 bits) in the aforementioned satellite broadcasting system with M=6 and N=5, description is made on a de-interleaving operation with a frame structure of 8 by 4 bits (32 bits) with M=3 and N=2, for convenience of illustration.

Each of the storage media 5a and 5b forming two planes has an address space of 8 by 4 bits. These storage media 5a and 5b are hereinafter referred to as planes A and B respectively.

FIG. 16 shows timings of transmitted data signals DIN not yet de-interleaved and clocks CLK, and the transmission order of the data signals DIN. FIG. 17 shows timings of de-interleaved data signals DOUT and clocks CLK, and the transmission order of the data signals DOUT. As shown in these figures, the de-interleaving operation is adapted to sequence the data signals DIN, which are transmitted in the order of 0, 1, 2, 3, . . . , 30 and 31, as 0, 4, 8, 12, . . . , 27 and 31.

FIG. 18 shows addresses (for one plane) of each storage medium in the form of a matrix, for convenience of illustration (it is assumed that the planes A and B are identical to each other). FIG. 19 shows an order for storing data signals in the storage medium plane A in arbitrary K-th, (K+2)-th, (K+4)-th, . . . frames, where K represents an arbitrary integer. FIG. 20 shows an order for reading data signals from the storage medium plane B in the arbitrary K-th, (K+2)-th, (K+4)-th, . . . frames. The data signals are read from the storage medium plane A in arbitrary (K+1)-th, (K+3)-th, (K+5)-th, . . . frames in an order which is identical to that shown in FIG. 20. Similarly, the data signals are stored in the storage medium plane B in the arbitrary (K+1)-th, (K+3)-th, (K+5)-th, . . . frames in an order which is identical to that shown in FIG. 19.

In the arbitrary K-th frame, only writing of the data signals is carried out with respect to the plane A, while only reading of the data signals is carried out with respect to the plane B. In the next arbitrary (K+1)-th frame, the data are read from the plane A in which the data have been written in the K-th frame, and data writing is carried out in the plane B. De-interleaving for one frame is completed with an operation for two frames, so that it is possible to sequence (de-interleave) the order of the data signals DIN shown in FIG. 16 to that shown in FIG. 17. Following the (K+2)-th frame, the operations in the K-th and (K+1)-th frames are repeated.

Referring again to FIG. 15, operations of the respective blocks are now described. The clocks CLK, which are pulses synchronized with the data signals DIN, are inputted in the counter circuit 2 from the clock input terminal 1. The counter circuit 2 outputs address signals for the storage media 5a and 5b to the signal selection circuit 4. The counter circuit 3 detects that the counter circuit 2 completes counting of the clocks CLK for one frame, and counts the frame number. The signal selection circuit 4 switches connection between the output of the counter circuit 2 and address signal inputs of the storage media 5a and 5b in accordance with the address order shown in FIG. 18 along the output of the counter circuit 3, so that the storage media 5a and 5b can be addressed in the orders shown in FIGS. 19 and 20.

A plane in which the data signals are written is supplied with addresses in order of 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 and 31. A plane from which the data signals are read is supplied with addresses in order of 0, 4, 8, 12, 16, 20, 24, 28, 1, 5, 9, 13, 17, 21, 25, 29, 2, 6, 10, 14, 18, 22, 26, 30, 3, 7, 11, 15, 19, 23, 27 and 31.

A data input terminal 6 inputs data signals DIN not yet de-interleaved. A READ/WRITE switching signal input terminal 7 supplies a control signal R/W for properly selecting operation modes of the planes A and B to either reading or writing.

Since either the plane A or B outputs de-interleaved data signals DOUT, an output selector 9 properly selects either output, so that the de-interleaved data signals DOUT are outputted from a data output terminal 8.

Thus, the conventional de-interleaver must be equipped with two storage medium planes each of which has storage capacity for one frame, since the operation modes of the two storage medium planes are alternately switched between write and read modes every frame for carrying out a de-interleaving operation. This also applies to a conventional

SUMMARY OF THE INVENTION

According to a first aspect of the present invention, a signal converter for converting digital system data signals forming one frame by L unit signals with respect to a positive integer L in a unit of one frame comprises (a) a storage medium capable of specifying L addresses for writing and reading one unit signal every specified address in response to a prescribed control signal, (b) first counter means capable of repetitively counting inputted clock pulses in a range of 1 to L, (c) second counter means repetitively counting the number of repetition of the counting in the first counter means in a range of 1 to Kmax with respect to a cycle Kmax for circulating a prescribed replacement of sequencing L integers every counting, and (d) signal selection means for specifying an address, corresponding to an integer obtained by carrying out the prescribed replacement on a count value in the first counter means by K times in correspondence to a count value K in the second counter means, with respect to the storage medium.

The signal converter according to the first aspect of the present invention implements interleaving and de-interleaving by sequencing L unit signals forming one frame by a prescribed replacement. In order to use this converter, the clock pulses inputted in the first counter means are supplied in synchronization with the respective unit signals which are inputted in the storage medium. Thus, the first counter means repetitively counts the number of the unit signals inputted in the storage medium in the range of 1 to L, while the second counter means repetitively counts the frame number of the data signals inputted in the storage medium in a range of 1 to (circulation cycle of the replacement). The signal selection means duplicates the replacement every renewal of the frame number, and specifics an address obtained by performing the duplicated replacement on the number of the unit signals, which is the count value of the first counter means, with respect to the storage medium.

The control signal inputted in the storage medium is so provided as to specify reading and writing subsequent thereto every input of the unit signal. Every reading of each of the L unit signals forming one frame, therefore, a unit signal belonging to the next frame is written in subsequence. In other words, each unit signal belonging to one frame is read when each unit signal for the next frame is written. Therefore, the address order for reading unit signals belonging to one frame is obtained by performing the prescribed replacement on that for writing the same. Namely, unit signals belonging to one frame which are written in the storage medium are sequenced by the prescribed replacement to be read. Thus, interleaving and de-interleaving corresponding to the prescribed replacement are implemented. It is possible to implement arbitrary interleaving and de-interleaving by arbitrarily selecting the replacement. The order of addresses specified with respect to the storage medium is supplied by a list of integers subjected to the prescribed replacement every frame, whereby the storage medium can be provided with capacity capable of storing data signals for one frame. Namely, it is possible to halve the capacity of the storage medium as compared with the prior art. Further, the inventive converter requires no output selector, which is requisite for the prior art.

The present invention is also directed to a communication system. According to a second aspect of the present invention, a communication system for transmitting digital system data signals forming one frame by L unit signals with respect to a positive integer L by interleaving the same in a unit of one frame and de-interleaving received data signals comprises (a) a first signal converter, which is provided on a transmission side, including (a-1) a first storage medium capable of specifying L addresses for writing and reading one unit signal every specified address in response to a prescribed first control signal, (a-2) first counter means capable of repetitively counting inputted clock pulses in a range of 1 to L, (a-3) second counter means repetitively counting the number of repetition of the counting in the first counter means in a range of 1 to Kmax with respect to a cycle Kmax for circulating a prescribed replacement of sequencing L integers every counting, and (a-4) first signal selection means for specifying an address, corresponding to an integer obtained by carrying out the prescribed replacement on a count value in the first counter means by K times in correspondence to a count value K in the second counter means, with respect to the first storage medium, and (b) a second signal converter, which is provided on a receiving side, including (b-1) a second storage medium capable of specifying L addresses for writing and reading one unit signal every specified address in response to a prescribed second control signal, (b-2) third counter means capable of repetitively counting inputted clock pulses in a range of 1 to L, (b-3) fourth counter means repetitively counting the number of repetition of the counting in the third counter means in the range of 1 to Kmax every counting, and (b-4) second signal selection means for specifying an address, corresponding to an integer obtained by carrying out the prescribed replacement on a count value in the third counter means by K times in correspondence to a count value K in the fourth counter means, with respect to the second storage medium.

The communication system according to the second aspect of the present invention is provided with the signal converters according to the first aspect on transmission and receiving sides. In such a pair of signal converters, replacements employed for address generation are reversed to each other. Therefore, data signals interleaved by the transmission side converter are de-interleaved by the receiving side converter and decoded to the original data signals. This communication system comprising the signal converters according to the first aspect of the present invention also has the aforementioned advantages in common.

According to a third aspect of the present invention, a signal converter for converting digital system data signals forming one frame by $2^M$ by $2^N$ unit signals with respect to positive integers M and N in a unit of one frame comprises (a) a storage medium capable of specifying $2^M$ by $2^N$ addresses for writing and reading one unit signal every specified address in response to a prescribed control signal, (b) first counter means capable of repetitively counting inputted clock pulses in a range of 1 to $2^M$ by $2^N$, (c) second counter means repetitively counting the number of repetition of the counting in the first counter means in a range of 1 to Kmax with respect to Kmax provided by a quotient of the least common denominator of N and (M+N) by N every counting, and (d) signal selection means for specifying an address, corresponding to an integer obtained by circulatingly shifting a count value in the first counter means by N by K digits in binary expression in a constant direction in correspondence to a count value K in the second counter means, with respect to the storage medium.

In the signal converter according to the third aspect of the present invention, the number of the unit signals forming one frame is provided by a specific numerical value and the replacement employed for address generation has a certain simple form in the signal converter according to the first aspect. In this signal converter, the number L of the unit signals forming one frame is that maximally expressible by powers of 2, i.e., in a prescribed number of digits (M+N) in binary expression, and the replacement employed for address generation is that of circulatingly shifting a list of L integers toward upper or lower digits by a constant number of digits in binary expression. Therefore, the circulation cycle Kmax of the replacement will not exceed (M+N) at the maximum since the same is the quotient of the least common denominator of (M+N) and N by N. Namely, the second counter means can sufficiently count the number in a range of 1 to (M+N) at the most. Further, the signal selection means can sufficiently carry out (M+N) replacements with respect to the list of L integers. Thus, both of the second counter means and the signal selection means can be simply structured. Further, the replacements are simply adapted to digit shifting in binary expression, whereby the signal selection means can be further simplified in structure. This signal converter, which is in a specific mode of that according to the first aspect, also has the aforementioned advantages in common.

Preferably, the signal converter further comprises (e) control means for supplying the control signal to the storage medium so that the storage means carries out the reading of the one unit signal and writing subsequent thereto every input of the clock pulse.

Preferably, the signal converter further comprises (f) signal input means for inputting the one unit signal in the storage medium in synchronization with a period of the storage medium carrying out the writing of the one unit signal.

Preferably, the signal converter further comprises (g) clock generation means for generating the clock pulses.

Preferably, the signal input means comprises (f-1) A-D conversion means for obtaining digital system signals by converting analog system signals which are inputted from the exterior.

Preferably, the signal converter further comprises (h) modulation means for obtaining modulated signals by modulating the unit signals which are read from the storage medium.

Preferably, the signal converter further comprises (i) transmission means for transmitting the demodulated signals.

Preferably, the transmission means comprises (i-1) radio transmission means for transmitting the modulated signals through a medium of electric waves.

Preferably, the signal input means further comprises (f-2) encoding means for encoding the digital system signals.

Preferably, the signal converter further comprises (j) D-A conversion means for converting the unit signals which are read from the storage medium from a digital system to an analog system.

Preferably, the signal input means comprises (f-3) demodulation means for demodulating modulated signals which are inputted from the exterior.

Preferably, the signal input means further comprises (f-4) receiving means for receiving the modulated signals.

Preferably, the receiving means comprises (f-4-1) radio receiving means for receiving the modulated signals which are propagated through a medium of electric waves.

Preferably, the signal converter further comprises (k) decoding means for decoding the unit signals which are read from the storage medium and inputting the same in the D-A conversion means.

Preferably, the one unit signal is a 1-bit signal.

Preferably, the signal selection means and the storage medium are coupled with each other by M+N input signal lines and addresses of the storage medium are specified by binary numbers which are expressed by binary signals on the input signal lines, and the signal selection means and the first counter means are coupled with each other by M+N output signal lines, and binary signals expressing count values in the first counter means in binary numbers are transmitted to the signal selection means through the output signal lines.

Preferably, the signal selection means comprises (d-1) 1 to Kmax switches capable of switching between the output lines and the input lines, and the Kmax switches are connected in parallel with each other so that only a K-th switch selectively enters a closed state in correspondence to the count value K in the second counter means, while a J-th switch couples M+N output signal lines with M+N input signal lines to circulatingly shift signals on the output signal lines in a constant direction by N×J digits in binary expression in a closed state with respect to each integer J in a range of 1 to Kmax.

Preferably, the signal selection means comprises (d-2) first to (M+N)-th stage flip-flops which are circulatingly cascade-connected with each other so that outputs of the respective stages are connected to the respective input signals, while holding input signals in outputs thereof in synchronization with trigger signals, (d-3) data selectors which are interposed between the outputs of respective stages of the flip-flops and inputs of next-stage flip-flops for selecting either the outputs of the respective stages or signals on the respective output signal lines in response to selection signals and inputting the same to the next stages, and (d-4) timing control means for transmitting the selection signals so that the respective data selectors select the signals on the respective output signal lines in synchronization with the clock pulses while transmitting the trigger signals to the respective flip-flops, and thereafter transmitting the selection signals so that the respective data selectors select the outputs of the respective stages while transmitting the trigger signals so that signals expressing binary numbers obtained by circulatingly shifting the binary numbers which are expressed by the signals on the output signal lines by N by K digits in a constant direction are outputted on the input signal lines in correspondence to the count value K.

Preferably, the storage medium comprises (a-1) a semiconductor storage element.

According to a fourth aspect of the present invention, a communication system for transmitting digital system data signals forming one frame by $2^M$ by $2^N$ unit signals with respect to positive integers M and N by interleaving the same in a unit of one frame and de-interleaving received data signals comprises (a) a first signal converter, which is provided on a transmission side, comprising (a-1) a first storage medium capable of specifying $2^M$ by $2^N$ addresses for writing and reading one unit signal every specified address in response to a prescribed first control signal, (a-2) first counter means capable of repetitively counting inputted clock pulses in a range of 1 to $2^M$ by $2^N$, (a-3) second counter means repetitively counting the number of repetition of the counting in the first counter means in a range of 1 to Kmax with respect to Kmax provided by a quotient of the least common denominator of N and (M+N) by N every counting, and (a-4) first signal selection means for specifying an address, corresponding to an integer obtained by circulatingly shifting a count value in the first counter means by N by K digits in binary expression in a constant direction in correspondence to a count value K in the second counter means, with respect to the first storage medium, and (b) a second signal converter, which is provided on a receiving side, comprising (b-1) a second storage medium capable of specifying $2^M$ by $2^N$ addresses for writing and reading one unit signal every specified address in response to a prescribed second control signal, (b-2) third counter means capable of repetitively counting inputted clock pulses in a range of 1 to $2^M$ by $2^N$, (b-3) fourth counter means repetitively counting the number of repetition of the counting in the third counter means in the range of 1 to Kmax every counting, and (b-4) second signal selection means for specifying an address, corresponding to an integer obtained by circulatingly shifting a count value in the third counter means by N by K digits in binary expression in a direction which is reverse to the constant direction in correspondence to a count value K in the fourth counter means, with respect to the second storage medium.

The communication system according to the fourth aspect of the present invention comprises the signal converters according to the third aspect in transmission and receiving sides. In such a pair of signal converters, replacements employed for address generation are reversed to each other. Therefore, data signals interleaved by the transmission side converter are de-interleaved by the receiving side converter and decoded to the original data signals. This communication system comprising the signal converters according to the third aspect of the present invention also has the aforementioned advantages in common.

Accordingly, an object of the present invention is to provide a signal converter which can halve the storage capacity of a storage medium as compared with the prior art, i.e., to that for one frame, for carrying out interleaving and de-interleaving, and a communication system comprising a set of such signal converters.

Throughout the specification, the term "signal converter" generically indicates an interleaver and a de-interleaver.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram schematically showing a structure of a communication system according to the embodiment of the present invention;

FIG. 6 is an explanatory diagram showing an order for specifying addresses every frame in the embodiment of the present invention;

FIG. 7 is an explanatory diagram showing an order for specifying addresses every frame in the embodiment of the present invention;

FIG. 15 is a block diagram showing a structure of a conventional de-interleaver;

FIG. 16 is an explanatory diagram showing an order of data signals not yet de-interleaved;

FIG. 18 is an explanatory diagram showing addresses of a conventional storage medium in the form of a matrix;

FIG. 19 is an explanatory diagram of orders for storing and reading data signals in and from a conventional storage medium; and FIG. 20 is an explanatory diagram of orders for storing and reading data signals in and from a conventional storage medium.

DESCRIPTION OF THE PREFERRED EMBODIMENTS

1. Structure and Operation of Communication System

FIG. 2 is a block diagram schematically showing the structure of a communication system employing an interleaving system. In this communication system, an interleaver and a de-interleaver are built in transmission and receiving sides respectively.

On the transmission side, analog signals such as voice signals, for example, are first convened to PCM-modulated digital signals by an A-D conversion part. These digital signals are converted in a PCM encoding part to a format specific to the communication system, and interleaved by the interleaver provided in the PCM encoding part. The processed digital signals are subjected to QPSK modulation, which is a type of phase modulation, and thereafter transmitted by a transmitter in the form of electric waves.

On the receiving side, on the other hand, operations reverse to those on the transmission side are successively carried out to take out the voice signals. Namely, a receiver receives the electric waves, which in turn are subjected to QPSK demodulation. Thereafter the interleaving is released by a PCM decoding part, and the digital signals are D-A converted by a D-A conversion part so that the original analog sound signals are taken out.

2. Structure of De-Interleaver 10

Figures 1, 3, 4, 5:
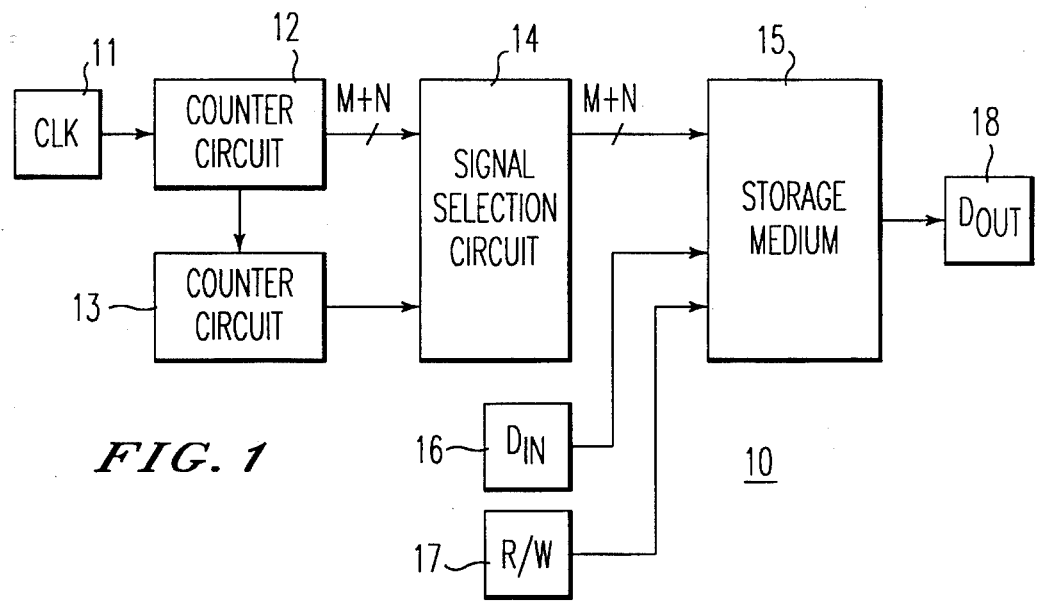
FIG. 1 is a block diagram showing a structure of a de-interleaver according to an embodiment of the present invention.
FIG. 3 is an explanatory diagram showing an order for specifying addresses every frame in the embodiment of the present invention.
FIG. 4 is an explanatory diagram showing an order for specifying addresses every frame in the embodiment of the present invention.
FIG. 5 is an explanatory diagram showing an order for specifying addresses every frame in the embodiment of the present invention.

FIG. 1 is a block diagram showing the structure of a de-interleaver 10 according to an embodiment of the present invention. An interleaver is identical in structure to the de-interleaver 10, and hence only the de-interleaver 10 is hereafter described to omit redundant description. A principal part of the de-interleaver 10 is formed by a counter circuit (first counter means) 12, another counter circuit (second counter means) 13, a signal selection circuit (signal selection means) 14 and a storage medium 15.

In the de-interleaver 10, one frame is formed by $2^M$ by $2^N$ bit data signals with respect to positive integers M and N. The storage medium 15 is addressable in a range of 1 to $2^M$ by $2^N$, so that 1-bit length data signals can be written in and read from the respective addresses. This storage medium 15 forms a storage space for carrying out de-interleaving. Data signals DIN not yet de-interleaved are inputted in the storage medium 15 from the exterior of the de-interleaver 10 through a data input terminal 16, while a control signal R/W is inputted through a READ/WRITE switching signal input terminal 17. The storage medium 15 selectively executes either writing or reading of the data signals in response to the value of the control signal R/W. De-interleaved data signals DOUT are outputted from the storage medium 15 to the exterior of the de-interleaver 10 through a data output terminal 18. The storage medium 15 is formed by a semiconductor memory such as a RAM, for example.

Clocks CLK are inputted in the counter circuit 12 through a clock input terminal 11. The clocks CLK are formed by a train of repeated pulses, so that a pulse is generated every time a bit forming a unit signal of each data signal DIN is inputted in the data input terminal 16, in synchronization therewith. The counter circuit 12 repetitively counts the number of the pulses of the clocks CLK in a range of 1 to $2^M$ by $2^N$. The other counter circuit 13 repetitively counts the number times of the counter circuit 12 repeating the counting of 1 to $2^M$ by $2^N$, i.e., the frame number of the inputted data signals DIN, in a range of 1 to Kmax. The positive integer Kmax is provided by a quotient with respect to the least common denominator of (M+N) and N by N. Therefore, Kmax is any integer in a range of 2 to (M+N). When M=N, Kmax=2. The signal selection circuit 14 addresses the storage medium 15 on the basis of the count values of the counter circuits 12 and 13. The operation of the signal selection circuit 14 is described later.

When M=3 and N=2, for example, one frame is formed by $2^3$ by $2^2$=32-bit data signals. Therefore, the counter circuit 12 has 5-bit outputs in binary numbers, and the addresses of the storage medium 15 are also specified by 5-bit binary numbers. Therefore, five signal lines are sufficient for transmitting signals from the counter circuit 12 to the signal selection circuit 14, and from the signal selection circuit 14 to the storage medium 15. The counter circuit 12 repetitively counts the pulses of the clocks CLK in a range of 1 to 32. Since Kmax=5, the counter circuit 13 repetitively counts the frame number in a range of 1 to 5.

3. Operation of De-Interleaver 10

For the purpose of convenience in illustration, the operation of the de-interleaver 10 is described with respect to the case of M=3 and N=2.

Figure 17A:
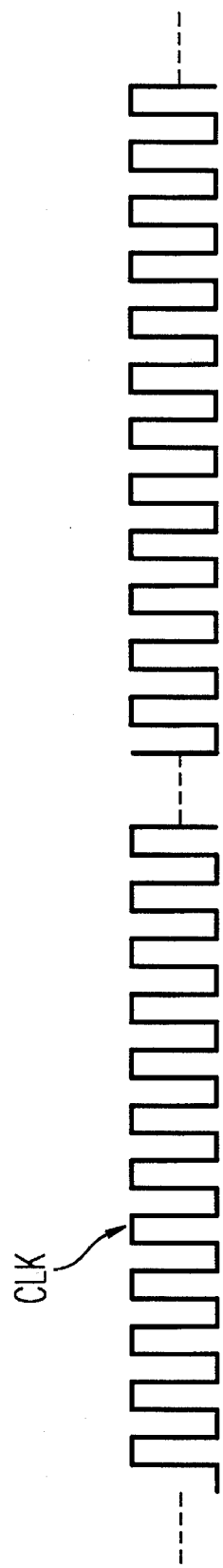
FIG. 17 is an explanatory diagram showing an order of de-interleaved data signals.
Figure 17B:
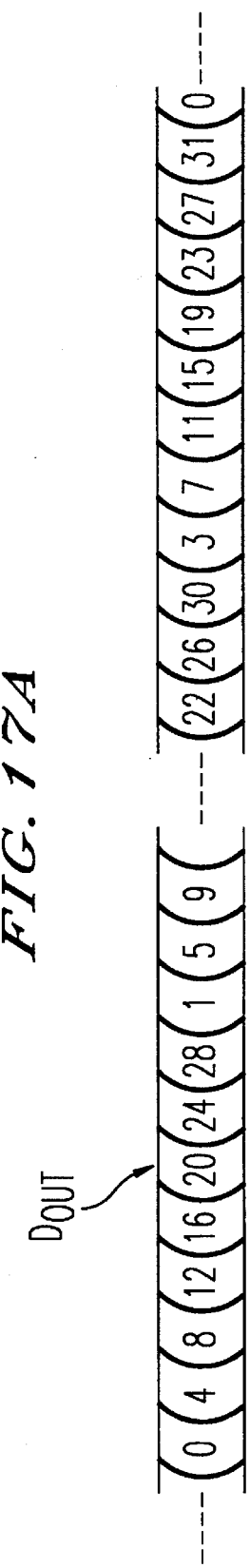

The timings of the data signals DIN not yet de-interleaved and the clocks CLK inputted in the de-interleaver 10 and the input order for the data signals DIN are shown in FIG. 16. Further, the timings of the de-interleaved data signals DOUT and the clocks CLK and the output order for the data signals DOUT are shown in FIG. 17. As shown in these figures, the data signals DIN inputted in the order of 0, 1, 2, 3, . . . , 30 and 31 are sequenced as 0, 4, 8, 12, . . . , 27 and 31 by de-interleaving processing, and outputted.

This de-interleaving processing can be achieved by temporarily writing data signals for one frame in the storage medium 15 while addressing the same in a certain order, and thereafter reading the temporarily written data signals while specifying the addresses in an order obtained by performing N=2 bit leftward rotation (circulatory shifting by two digits toward upper digits) or M=3 bit rightward rotation (circulatory shifting by three digits toward lower digits) in binary expression on the aforementioned address order. Table 1 shows the aforementioned operations, assuming that the counter circuit 12 outputs C0, C1, C2, C3 and C4 from the lowermost bit and the storage medium 15 address-inputs A0, A1, A2, A3 and A4 from the lowermost bit.

TABLE 1

| Address Input in Storage Medium | A4 | A3 | A2 | A1 | A0 |
|---|---|---|---|---|---|
| K-th Frame | C4 | C3 | C2 | C1 | C0 |
| (K+1)-th Frame | C2 | C1 | C0 | C4 | C3 |
| (K+2)-th Frame | C0 | C4 | C3 | C2 | C1 |
| (K+3)-th Frame | C3 | C2 | C1 | C0 | C4 |
| (K+4)-th Frame | C1 | C0 | C4 | C3 | C2 |

When A4 and C4, A3 and C3, A2 and C2, A1 and C1, and A0 and C0 are connected with each other respectively to supply addresses for writing data signals in the storage medium 15, for example, A4 and C2, A3 and C1, A2 and C0, A1 and C4, and A0 and C3 are connected with each other to supply addresses for reading and outputting the data signals.

The signal selection circuit 14 connects the address inputs of the storage medium 15 and the outputs of the counter circuit 12 as shown in Table 1 in the respective frames. Every time the data signals DOUT are read from one address specified by the signal selection circuit 14 in a unit of one bit, 1-bit unit data signals DIN are written in the same address in sequence thereto. This operation is implemented by the control signal R/W first indicating reading and then indicating writing every time the data signals DIN are inputted in the storage medium 15 in a unit of one bit. Thus, connection between the address signals inputted in the storage medium 15 and the outputs of the counter circuit 12 is successively switched every frame, thereby implementing de-interleaving.

The interconnection between the address signals inputted in the storage medium 15 and the outputs of the counter circuit 12 regularly circulates in the cycle Kmax also when M and N are general positive integers. Thus, the counter circuit 13 is so formed as to count the frame number in the range of 1 to Kmax, as hereinabove described. Thus, the cycle of the circulation is an integer between 2 and (M+N). Particularly when M=N, the interconnection circulates in a cycle of 2 frames. In the aforementioned example where M=3 and N=2, the interconnection circulates every five frames, to return to original connection.

FIGS. 3 to 7 show orders for specifying the addresses, which are arranged as shown in FIG. 18 for the purpose of convenience, of the storage medium 15 for the respective frames. It is assumed that the storage medium 15 is addressed in the order shown in FIG. 3, for example, and data signals are written after the same are read in the respective addresses. Then, the storage medium 15 is addressed in the order shown in FIG. 4 in the next (K+1)-th frame, so that data signals are written after the same are read in the respective addresses. Similarly, FIGS. 5, 6 and 7 show addressing orders in the (K+2)-th, (K+3)-th and (K+4)-th frames respectively. According to this embodiment, the order for specifying the addresses circulates in five frames, and hence the order returns in the (K+5)-th frame to that in the K-th frame.

4. First Mode of Signal Selection Circuit 14

Figure 8:
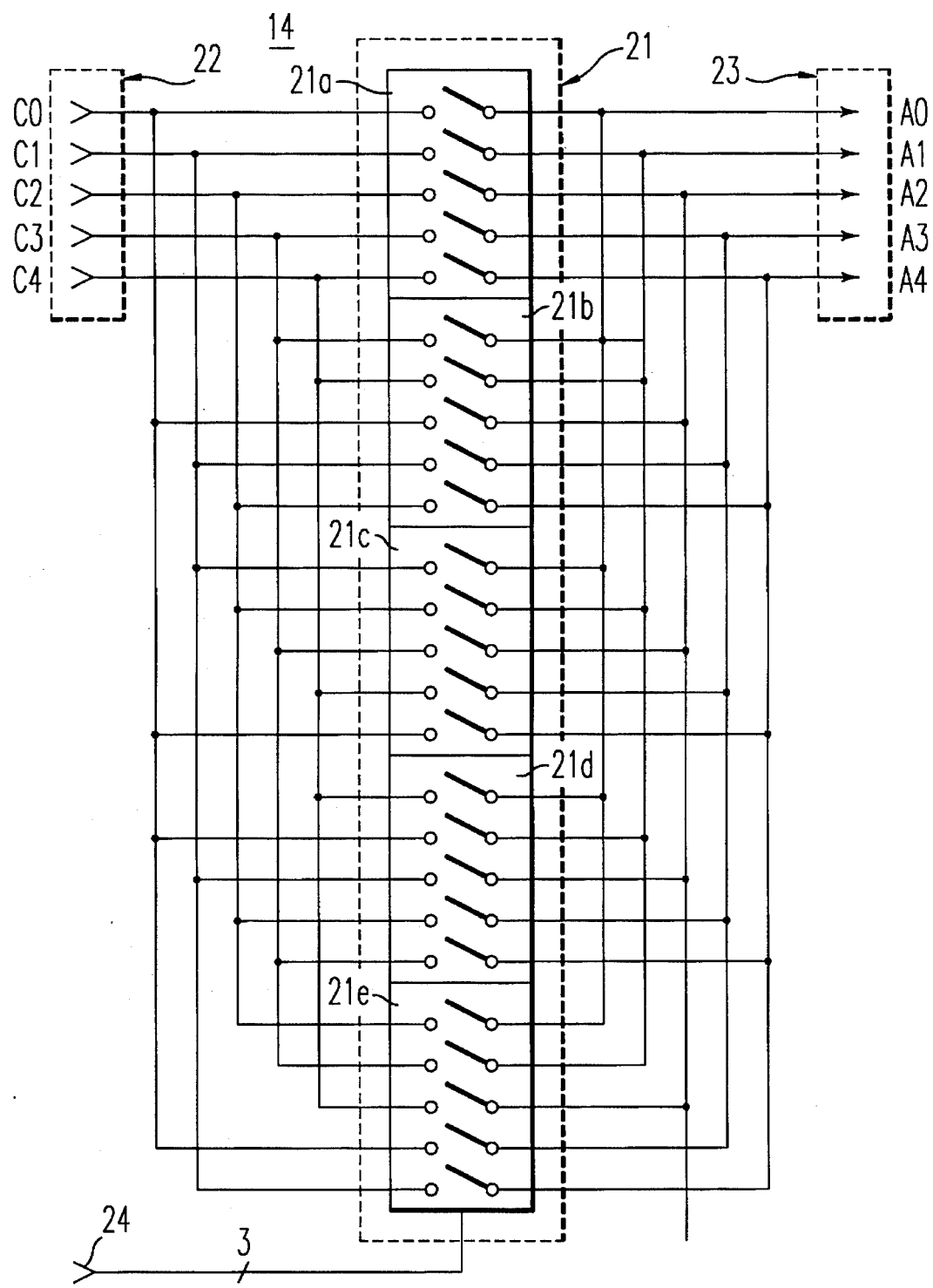
FIG. 8 is a circuit diagram showing an internal structure of a signal selection circuit in a mode of the present invention.

FIG. 8 is a circuit diagram showing a first mode of the internal structure of the signal selection circuit 14. A switch 21 forms a principal part of this signal selection circuit 14. The switch 21 comprises five switch blocks 21a to 21e corresponding to Kmax. Each of the switch blocks 21a to 21e comprises switches which can simultaneously interrupt transmission paths for 5-bit signals corresponding to M+N. The switch 21 is so structured that only one of the five switch blocks 21a to 21e selectively enters an ON state and the remaining four switch blocks enter OFF states. An input terminal 22 is connected to the output of the counter circuit 12, while an output terminal 23 is connected to the address input of the storage medium 15. A selection signal input terminal 24, which is another input terminal, is connected to the output of the counter circuit 13.

The one of the switch blocks 21a to 21e which enters an ON state is decided on the basis of a selection signal transmitted from the counter circuit 13 through the selection signal input terminal 24, i.e., the count value of the frame number. Each of the switch blocks 21a to 21c executes connection between count values C0, C1, C2, C3 and C4 of the counter circuit 12 inputted through the input terminal 22 and address signals A0, A1, A2, A3 and A4 transmitted to the storage medium 15 through the output terminal 23 in correspondence to prescribed digit shifting. Every time the count value of the frame number is renewed, the switch blocks 21a to 21e selectively enter ON states in an order of 21a, 21b, 21c, 21d, 21e, 21a, 21b, . . . Thus, the address signals A0, A1, A2, A3 and A4, which are obtained by successively leftwardly rotating the count values C0, C1, C2, C3 and C4 of the counter circuit 12 by two bits every renewal of the frame number, are transmitted to the storage medium 15.

5. Second Mode of Signal Selection Circuit 14

Figure 9:
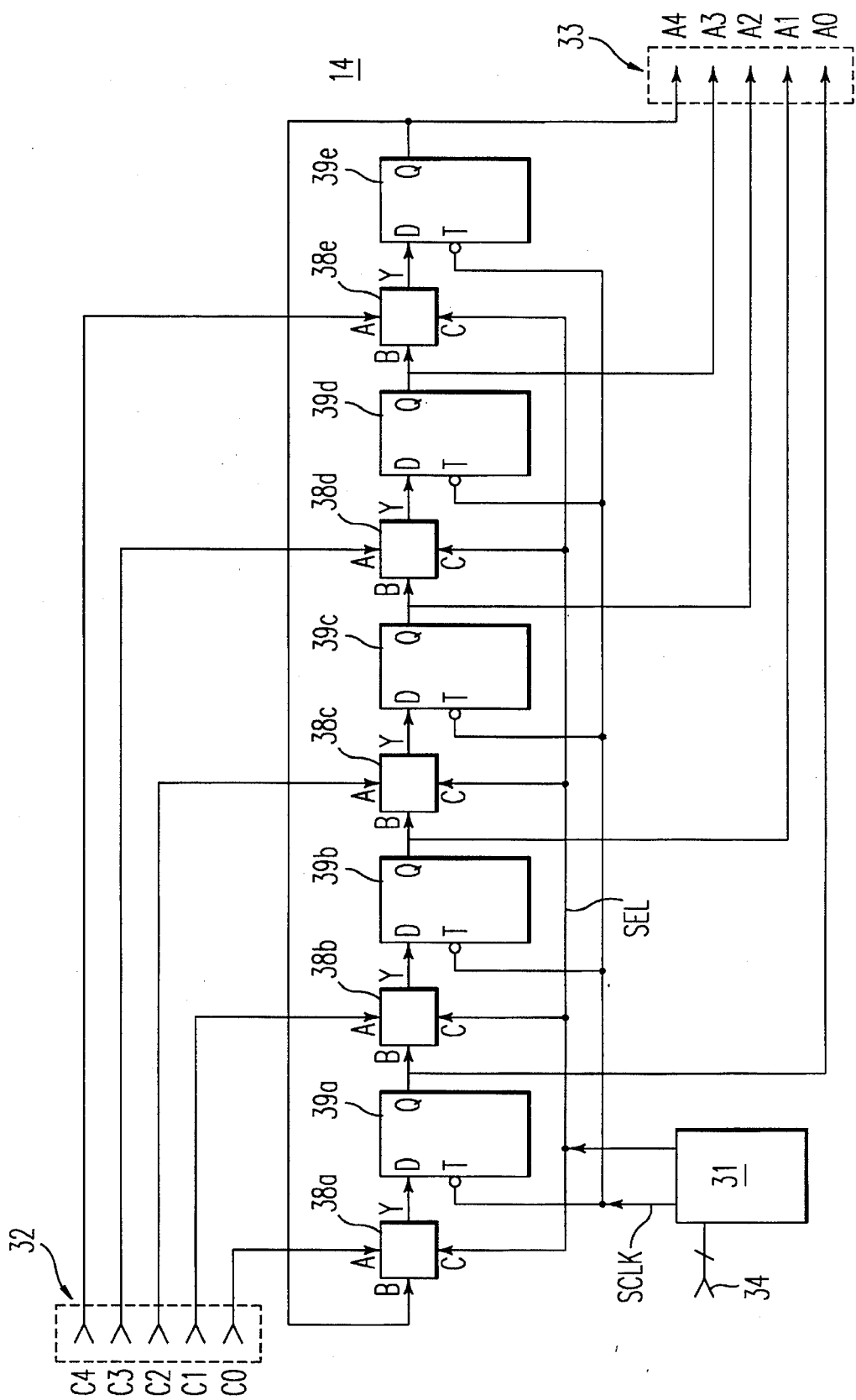
FIG. 9 is a circuit diagram showing an internal structure of a signal selection circuit in another mode of the present invention.

FIG. 9 is a circuit diagram showing a second mode of the internal structure of the signal selection circuit 14. An input terminal 32 is connected to the output of the counter circuit 12, while an output terminal 33 is connected to the address input of the storage medium 15. A selection signal input terminal 34, which is another input terminal, is connected to the output of the counter circuit 13. D flip-flops 39a to 39e which are circulatingly cascade-connected with each other in five stages form the so-called shift register. Each of the D flip-flops 39a to 39e holds a signal inputted in its input terminal D in an output terminal Q in synchronization with fall of a shift clock SCLK inputted in its trigger terminal T. Selectors 38a to 38e are interposed between the D flip-flops 39a to 39e respectively. Each of the selectors 38a to 38e selects one of input signals received in two input terminals A and B and outputs the same to an output terminal Y in response to the value of a selection signal SEL inputted in a selection terminal C. As to the shift clocks SCLK, a train of pulses corresponding to the count values of the frame numbers transmitted from the selection signal input terminal 34 are generated by a timing control circuit 31 with the selection signals SEL.

Figure 10:
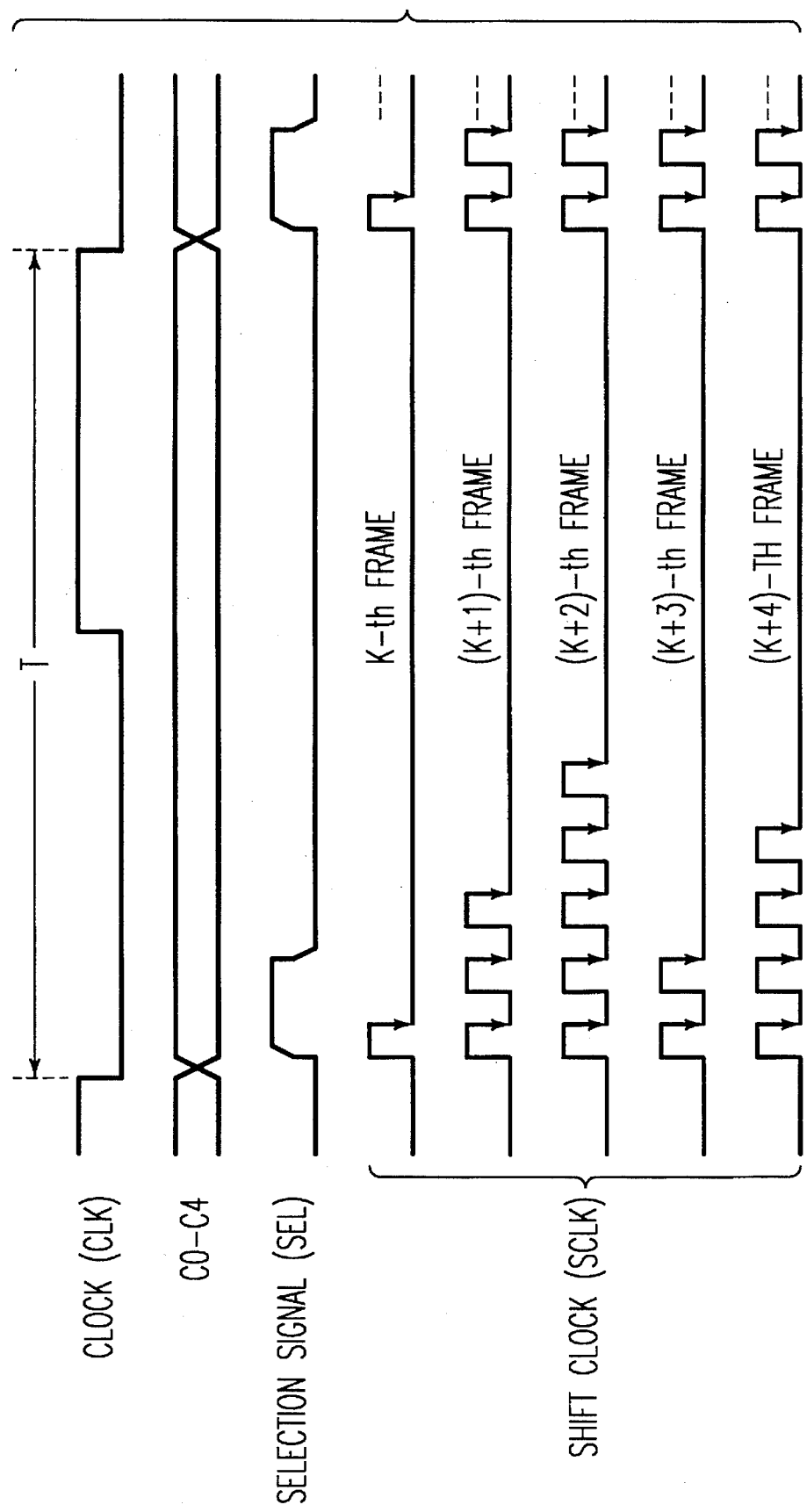
FIG. 10 is a timing chart showing signals in respective parts of the signal selection circuit shown in FIG. 9.

FIG. 10 is a timing chart of signals in the respective parts of the signal selection circuit 14. In a cycle T between fall to next fall in the clocks CLK inputted in the counter circuit 12, reading and writing of 1-bit unit data signals are carried out in the storage medium 15. The timing control circuit 31 raises up the selection signal SEL for a constant period immediately after fall of the clock CLK Each of the selectors 38a to 38e selects an input signal received in the input terminal A and outputs the same to the output terminal Y when the selection signal SEL is at a high level, while the same selects and inputs an input signal received in the input terminal B in other period. When the selection signals SEL are at high levels, therefore, the count values C0 to C4 inputted from the input terminal 32 are inputted in the input terminals D of the D flip-flops 39a to 39e. At this time, the timing control circuit 31 starts to generate a prescribed number of pulse trains corresponding to the frame count values inputted from the selection signal input terminal 34 in the shift clocks SCLK. The D flip-flops 39a to 39e hold the count values C0 to C4 inputted in the input terminals D at the output terminals Q in synchronization with fall of the first pulse of the shift clocks SCLK.

In periods of second and subsequent pulses, the selection signals SEL return to low levels and hence output signals of precedent D flip-flops 39a to 39e are inputted in the input terminals D of the D flip-flops 39a to 39e. Therefore, the count values C0 to C4 are circulatingly shifted between the output terminals Q of the D flip-flops 39a to 39e by a number of times corresponding to the number of the second and subsequent pulses in an order of . . . , 39a, 39b, 39c, 39d, 39e, 39a, 39b, . . . Thus, the count values C0 to C4 are circulatingly shifted by a prescribed number of times in a range of 0 to 4 times, and outputted from the output terminal 33 as the address signals A0 to A4. The address signals A0 to A4 are obtained by successively leftwardly rotating the count values C0 to C4 by two bits by successively changing the pulse number of the shift clocks SCLK in the order shown in FIG. 10 every renewal of the frame count number.

6. Third Mode of Signal Selection Circuit 14

Figure 11:
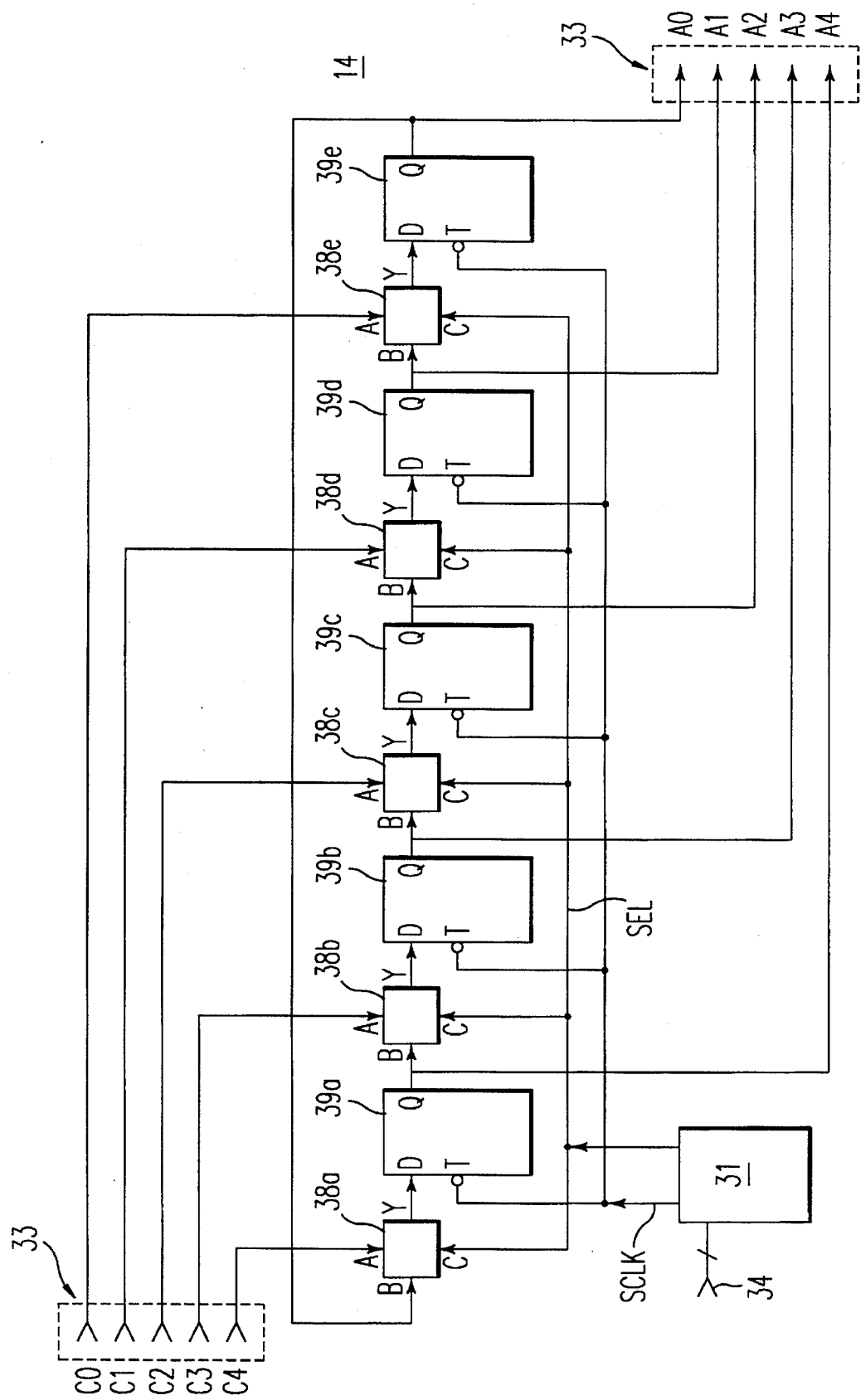
FIG. 11 is a circuit diagram showing an internal structure of a signal selection circuit in still another mode of the present invention.
Figure 12:
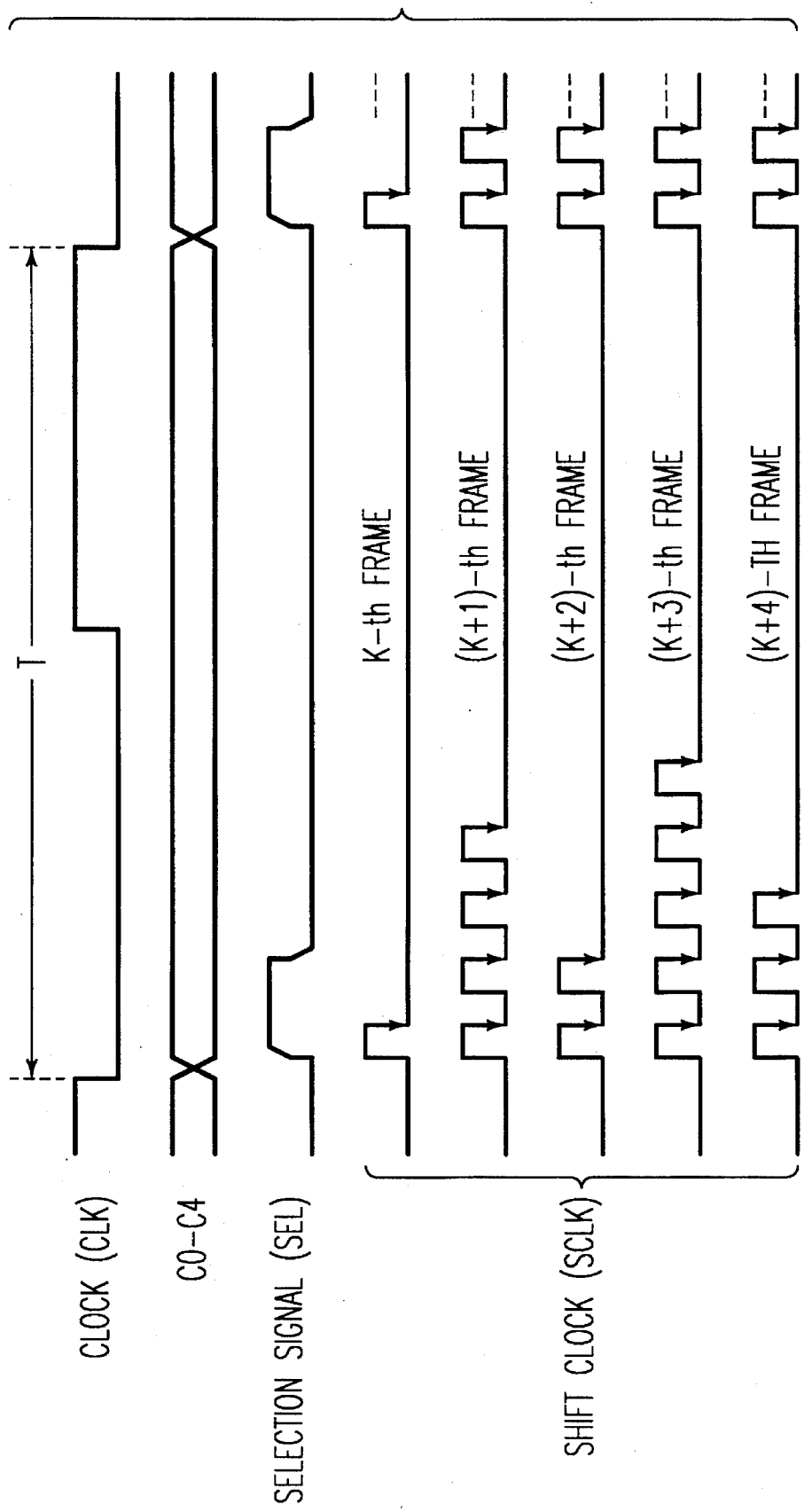
FIG. 12 is a timing chart showing signals in respective parts of the signal selection circuit shown in FIG. 11.

FIG. 11 is a circuit diagram showing a third mode of the internal structure of the signal selection circuit 14. In this signal selection circuit 14, count values C0 to C4 and address signals A0 to A4 are connected to input and output terminals 32 and 33 respectively in orders reverse to those in the signal selection circuit 14 shown in FIG. 9. FIG. 12 is a timing chart of signals in respective parts of the signal selection circuit 14. The address signals A0 to A4 are obtained by successively rightwardly rotating the count values C0 to C4 by three bits by successively changing the pulse number of shift clocks SCLK in the order shown in FIG. 12 every renewal of the frame count value. The 3-bit rightward rotation supplies the same result as that of the 2-bit leftward rotation to the address signals A0 to A4, whereby this signal selection circuit 14 has the same function as that of the signal selection circuit 14 shown in FIG. 9.

7. First Mode of Selector 38a

Figure 13:
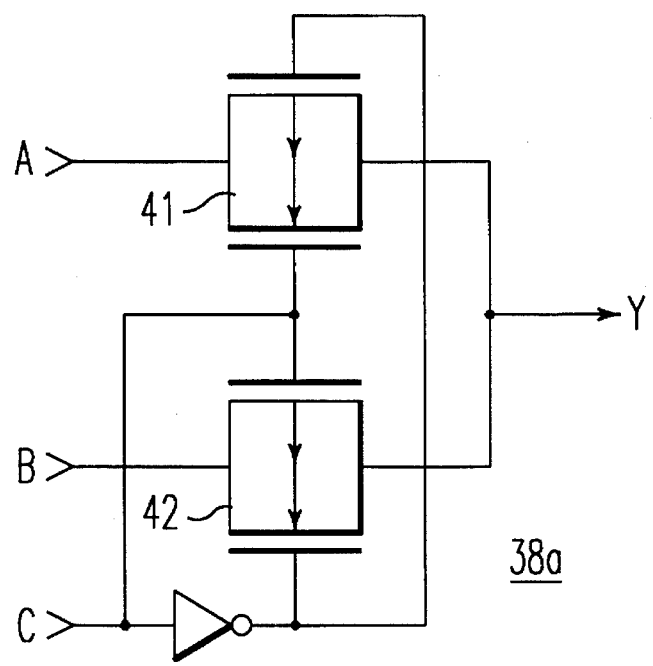
FIG. 13 is a circuit diagram showing an internal structure of a selector in a mode of the present invention.

FIG. 13 is a circuit diagram showing a first mode of the internal structure of the selector 38a employed for the signal selection circuit 14 shown in FIG. 9 or 11. The five selectors 38a to 38e are identical in structure to each other, and hence only the selector 38a is now described, to omit redundant description.

Only one of a pair of semiconductor switches 41 and 42 enters an ON state in response to a selection signal SEL which is inputted from a selection terminal C. Thus, one of input signals received in two input terminals A and B is selected in response to the value of the selection signal SEL inputted in the selection terminal C, to be outputted to an output terminal Y.

8. Second Mode of Selector 38a

Figure 14:
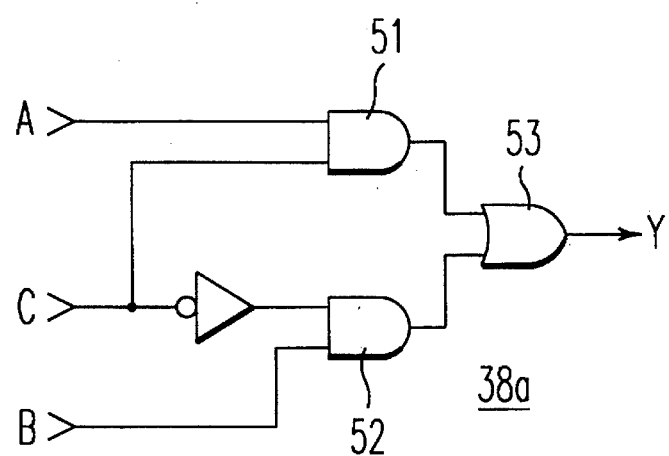
FIG. 14 is a circuit diagram showing an internal structure of the selector in another mode of the present invention.

FIG. 14 is a circuit diagram showing a second mode of the internal structure of the selector 38a which is employed for the signal selection circuit 14 shown in FIG. 9 or 11. When a selection signal SEL inputted from a selection terminal C is at a low level, an AND circuit 51 outputs a low level regardless of the value of an input signal received in an input terminal A, while another AND circuit 52 outputs the value of an input signal received in another input terminal B as such. Thus, an OR circuit 53 outputs the input signal received in the input terminal B to an output terminal Y. When the selection signal SEL is at a high level, on the other hand, the input signal received in the input terminal A is outputted to the output terminal Y. Namely, one of the input signals received in the two input terminals A and B is selected in response to the selection signal SEL inputted in the selection terminal C, to be outputted to the output terminal Y.

9. Interleaver

An interleaver can be formed similarly to the de-interleaver 10. In an interleaver and a de-interleaver which are employed in a communication system, it is necessary that conversion from data signals DIN to data signals DOUT in the interleaver is reverse to that in the de-interleaver. Therefore, an interleaver which is employed in a communication system in combination with the de-interleaver 10 is so formed as to obtain address signals A0 to A4 by rightwardly rotating count values C0 to C4 by two bits.

10. Modifications (1) Although M=3 and N=2 in the aforementioned embodiment, the values M and N can be arbitrarily selected so far as the same are positive integers.

(2) While one frame is formed by $2^M$ by $2^N$ bits and the address signals A0 to A4 are obtained by leftwardly or rightwardly rotating the count values C0 to C4 by N bits in the aforementioned embodiment which is related to an interleaver and a de-interleaver, the following general structure is also available: One frame may be formed by L bits with respect to an arbitrary positive integer L and address signals may be obtained by performing a replacement obtained by sequentially duplicating an arbitrary replacement every frame (i.e., by forming a product of replacements) on a count value of 1-bit unit input signals. The counter circuit 13 repetitively counts the clocks CLK between 1 and the replacement circulation cycle Kmax (a product obtained by repeating the replacement itself by Kmax times corresponds to a unit replacement). The storage medium may have capacity capable of storing data signals for one frame also in this structure.

The aforementioned embodiment corresponds to a specific structural example where $L=2^M$ by $2^N$ and the replacement is specifically simple in this general structure. Kmax described in the above embodiment corresponds to a specific case of the replacement circulation cycle Kmax. In the aforementioned embodiment, the counter circuit 13 may sufficiently carry out counting in a range of 1 to (M+N) at the most. Further, the signal selection circuit 14 may sufficiently perform (M+N) replacements at the maximum with respect to a list of L integers, and the replacements are adapted to simply carry out digit shifting in binary expression. Thus, the aforementioned embodiment is particularly excellent in a point that both of the counter circuit 13 and the signal selection circuit 14 can be simply structured.

(3) In each of the aforementioned embodiment and modifications, the minimum unit (unit signal) of the data signals sequenced by the replacement is 1 bit. However, sequencing may be carried out in units of a plurality of bits, in place of the 1-bit unit sequencing. In this case, the de-interleaver 10 may be so structured that the storage medium 15 can store a plurality of bits of unit signals every address, for example.

While the invention has been shown and described in detail, the foregoing description is in all aspects illustrative and not restrictive. It is therefore understood that numerous modifications and variations can be devised without departing from the scope of the invention.

What is claimed is:

1. A signal converter for converting digital system data signals forming one frame by L unit signals with respect to a positive integer L in a unit of one frame, said signal converter comprising:

input means for accepting a digital signal stream;

clocking means coupled to said input means for generating a clock pulse for each unit signal in the inputted digital signal stream received by said input means;

a storage medium of a size capable of specifying L addresses, coupled to said input means, for writing and reading one unit signal to a specified address in said storage medium, in response to a control signal;

first counter means having a capacity of 1 to L, coupled to said clocking means for repetitively counting the clock pulses in a range of 1 to L;

second counter means coupled to said first counter means for repetitively counting the number of repetition of said counting in said first counter means and wherein said second counter means operates in a range of 1 to Kmax with respect to a cycle Kmax wherein Kmax is determined as circulating a prescribed replacement of a sequencing of L integers for every overflow counting of said first counter means;

signal selection means for specifying an address in said storage medium, wherein said address corresponds to an integer obtained by carrying out said prescribed replacement on a count value in said first counter means by K times in correspondence to a count value K in said second counter means; and control means for supplying said control signal to said storage medium so that said storage means carries out said reading of said one unit signal and writing subsequent thereto every input of said clock pulse.

2. A communication system for transmitting digital data signals forming one frame by L signals with respect to a positive integer L by interleaving the same in a unit of one frame, and de-interleaving received said data signals, said communication system comprising:

(a) a first signal converter being provided on a transmission side, said first signal converter including:

(a-1) first input means for accepting a digital data stream, (a-2) first clocking means coupled to said first input means for generating a clock pulse for each unit signal in the inputted digital signal stream received by said first input means, (a-3) a first storage medium of a size capable of specifying L addresses, coupled to said first input means, for writing and reading one unit signal into a specified address in said first storage medium, in response to a first control signal, (a-4) first counter means having a capacity of 1 to L, coupled to said first clocking means for repetitively counting the clock pulses in a range of 1 to L, (a-5) second counter means coupled to said first counter means for repetitively counting the number of repetition of said counting in said first counter means and wherein said second counter means operates in a range of 1 to Kmax with respect to a cycle Kmax wherein Kmax is determined as circulating a prescribed replacement of a sequencing of L integers for every overflow counting of said first counter means, (a-6) first signal selection means for specifying an address in said first storage medium, wherein said address corresponds to an integer obtained by carrying out said prescribed replacement on a count value in said first counter means, with respect to said first storage medium, and (a-7) first control means for supplying said first control signal to said first storage medium so that said first storage medium carries out said reading of said one unit signal and writing subsequent thereto every input of said clock pulse; and (b) a second signal converter being provided on a receiving side, said second signal converter including:

(b-1) second input means for accepting a digital data stream, (b-2) second clocking means coupled to said second input means for generating a clock pulse for each unit signal in the inputted digital signal stream received by said second input means, (b-3) a second storage medium of a size capable of specifying L addresses, coupled to said second input means, for writing and reading one unit signal into a specified address in said second storage medium, in response to a second control signal, (b-4) third counter means having a capacity of 1 to L, coupled to said second clocking means for repetitively counting the clock pulses in a range of 1 to L, (b-5) fourth counter means coupled to said third counter means for repetitively counting the number of repetition of said counting in said third counter means and wherein said fourth counter means operates in a range of 1 to Kmax for every overflow counting of said third counter means, (b-6) second signal selection means for specifying an address in said second storage medium, wherein said address corresponds to an integer obtained by carrying out said prescribed replacement on a count value in said third counter means by K times in correspondence to a count value K in said fourth counter means, with respect to said second storage medium, and (b-7) second control means for supplying said second control signal to said second storage medium so that said second storage medium carries out said reading of said one unit signal and writing subsequent thereto every input of said clock pulse.

3. A signal converter for converting digital system data signals forming one frame by $2^M$ by $2^N$ unit signals with respect to positive integers M and N in a unit of one frame, said signal converter comprising:

(a) input means for accepting a digital data stream;

(b) a clock means coupled to said input means for generating a clock pulse upon receipt of a unit signal in the inputted digital data stream by said input means;

(c) a storage medium of a size capable of specifying $2^M$ by $2^N$ addresses, coupled to said input means, for writing and reading one unit signal into a specified address in said storage medium, in response to a control signal;

(d) first counter means capable of repetitively counting clock pulses generated by said clock means from 1 to $2^M$ by $2^N$;

(e) second counter means having a capacity of 1 to Kmax for counting the number of repetition of said counting in said first counter means with respect to Kmax provided by a quotient of the least common denominator of N and (M+N) by N every counting;

(f) signal selection means for specifying an address on said storage medium, corresponding to an integer obtained by circulatingly shifting a count value in said first counter means by N by K digits in binary expression in a constant direction in correspondence to a count value K in said second counter means, with respect to said storage medium; and (g) control means for supplying said control signal to said storage medium so that said storage means carries out said reading of said one unit signal and writing subsequent thereto every input of said clock pulse.

4. A signal converter in accordance with claim 3, wherein said signal input means comprises:

(f-1) A-D conversion means for obtaining digital system signals by converting analog system signals being inputted from the exterior.

5. A signal converter in accordance with claim 4, further comprising:

(h) modulation means for obtaining modulated signals by modulating said unit signals being read from said storage medium.

6. A signal converter in accordance with claim 5, further comprising:

(i) transmission means for transmitting said demodulated signals.

7. A signal converter in accordance with claim 6, wherein said transmission means comprises:

(i-1) radio transmission means for transmitting said modulated signals through a medium of electric waves.

8. A signal converter in accordance with claim 4, wherein said signal input means further comprises:

(f-2) encoding means for encoding said digital system signals.

9. A signal converter in accordance with claim 3, further comprising:

(j) D-A conversion means for converting said unit signals being read from said storage medium from a digital system to an analog system.

10. A signal converter in accordance with claim 9, wherein said signal input means comprises:

(f-3) demodulation means for demodulating modulated signals being inputted from the exterior.

11. A signal converter in accordance with claim 10, wherein said signal input means further comprises:

(f-4) receiving means for receiving said modulated signals.

12. A signal converter in accordance with claim 11, wherein said receiving means comprises:

(f-4-1) radio receiving means for receiving said modulated signals being propagated through a medium of electric waves.

13. A signal converter in accordance with claim 9, further comprising:

(k) decoding means for decoding said unit signals being read from said storage medium and inputting the same in said D-A conversion means.

14. A signal converter in accordance with claim 3, wherein said one unit signal is a 1-bit signal.

15. A signal converter in accordance with claim 3, wherein said signal selection means and said storage medium are coupled with each other by M+N input signal lines, said addresses of said storage medium being specified by binary numbers being expressed by binary signals on said input signal lines, and said signal selection means and said first counter means are coupled with each other by M+N output signal lines, binary signals expressing count values in said first counter means in binary numbers being transmitted to said signal selection means through said output signal lines.

16. A signal converter in accordance with claim 15, wherein said signal selection means comprises:

(d-1) 1 to Kmax switches capable of switching between said output lines and said input lines, said Kmax switches being connected in parallel with each other so that only K-th said switch selectively enters a closed state in correspondence to said count value K in said second counter means, J-th said switch coupling M+N said output signal lines with M+N said input signal lines to circulatingly shift signals on said output signal lines in a constant direction by N×J digits in binary expression in a closed state with respect to each integer J in a range of 1 to Kmax.

17. A signal converter in accordance with claim 15; wherein said signal selection means comprises:

(d-2) first to (M+N)-th stage flip-flops being circulatingly cascade-connected with each other so that outputs of respective said stages are connected to respective said input signals, while holding input signals in outputs thereof in synchronization with trigger signals, (d-3) data selectors being interposed between said outputs of respective stages of said flip-flops and inputs of next-stage said flip-flops for selecting either said outputs of respective said stages or signals on respective said output signal lines in response to selection signals and inputting the same to said next stages, and (d-4) timing control means for transmitting said selection signals so that respective said data selectors select said signals on respective said output signal lines in synchronization with said clock pulses while transmitting said trigger signals to respective said flip-flops, and thereafter transmitting said selection signals so that respective said data selectors select said outputs of respective said stages while transmitting said trigger signals so that signals expressing binary numbers obtained by circulatingly shifting said binary numbers being expressed by said signals on said output signal lines by N by K digits in a constant direction are outputted on said input signal lines in correspondence to said count value K.

18. A signal converter in accordance with claim 15, wherein said storage medium comprises:

(a-1) a semiconductor storage element.

19. A communication system for transmitting digital system data signals forming one frame by $2^M$ by $2^N$ unit signals with respect to positive integers M and N by interleaving the same in a unit of one frame, and de-interleaving received said data signals, said communication system comprising:

(a) a first signal converter being provided on a transmission side, said first signal converter comprising:

(a-1) first input means for accepting a digital data stream, (a-2) first clock means for generating a clock pulse for each unit signal in the inputted digital data stream received by said first input means, (a-3) a first storage medium having a capacity of $2^M$ by $2^N$ addresses for writing and reading one unit signal to a specified address in response to a first control signal, (a-4) first counter means having a capacity of 1 to $2^M$ by $2^N$ for repetitively counting clock pulses from said first clock means, (a-5) second counter means having a capacity of 1 to Kmax for repetitively counting the number of repetitions of said counting in said first counter means wherein Kmax is determined by a quotient of the least common denominator of N and (M=N) by N every counting, (a-6) first signal selection means for specifying an address, corresponding to an integer obtained by circulatingly shifting a count value in said first counter means by N and K digits in binary expression in a constant direction in correspondence to a count value K in said second counter means, with respect to said first storage medium and (a-7) first control means for supplying said control signal to said first storage medium so that said first storage medium carries out said reading of said one unit signal and writing subsequent thereto every input of said clock pulse; and (b) a second signal converter being provided on a receiving side, said second signal converter comprising:

(b-1) second input means for accepting a received digital data stream, (b-2) second clock means for generating a clock pulse for each unit signal received in said input means, (b-3) a second storage medium having a capacity of $2^M$ by $2^N$ addresses for writing and reading one unit signal to a specified address in response to a prescribed second control signal, (b-4) third counter means having a capacity of 1 to $2^M$ by $2^N$ for repetitively counting clock pulses from said second clock means, (b-5) fourth counter means repetitively counting the number of repetition of said counting in said third counter means in said range of 1 to Kmax every said counting, (b-6) second signal selection means for specifying an address, corresponding to an integer obtained by circulatingly shifting a count value in said third counter means by N by K digits in binary expression in a direction being reverse to said constant direction in correspondence to a count value K in said fourth counter means, with respect to said second storage medium, and (b-7) second control means for supplying said control signal to said second storage medium so that said second storage medium carries out said reading of said one unit signal and writing subsequent thereto every input of said clock pulse.

* * * * *